United States Patent [19]

Geier et al.

[11] 4,326,503

[45] Apr. 27, 1982

[54] TURBULENT SOLAR COLLECTOR

[75] Inventors: Leonard W. Geier, Natick; Kenneth F. Dunn, Arlington, both of Mass.

[73] Assignee: Raytheon Company, Lexington, Mass.

[21] Appl. No.: 126,222

[22] Filed: Mar. 3, 1980

[51] Int. Cl.³ .............................................. F24J 3/02
[52] U.S. Cl. .................................. 126/443; 126/417; 126/448; 126/450; 138/38; 138/39; 138/114; 165/178
[58] Field of Search ............... 126/443, 448, 444, 417, 126/450; 141/65, 66; 285/41, DIG. 12; 138/37, 114, 38; 29/DIG. 44, 870; 165/179, 178; 220/231, 420, 426; 206/524.8

[56] References Cited

U.S. PATENT DOCUMENTS

| | | | |
|---|---|---|---|
| 1,946,184 | 2/1934 | Abbot | 126/443 |
| 2,767,962 | 10/1956 | Blackburn | 220/420 X |
| 3,068,026 | 12/1962 | McKamey | 285/47 |
| 3,469,862 | 9/1969 | Conibeer . | |
| 4,183,351 | 1/1980 | Hinotani et al. | 126/443 |
| 4,186,725 | 2/1980 | Schwartz | 126/443 |

FOREIGN PATENT DOCUMENTS 2827082  3/1979  Fed. Rep. of Germany ...... 126/443

*Primary Examiner*—Larry Jones
*Attorney, Agent, or Firm*—John T. Meaney; Joseph D. Pannone; Richard M. Sharkansky

[57] ABSTRACT

A solar collector of the tubular type comprising a solar energy transmissive outer tube encircling a solar energy converter inner tube disposed for having a flow of fluid directed longitudinally through it. The outer and inner tubes have respective opposing end portions sealed to one another and respective mid-portions radially spaced from one another for forming an interposed vacuum chamber. The sealed joints may include at least one flexible member disposed to compensate for differences in thermal characteristics of the inner and outer tubes. The inner tube is provided with an exhaust tubulation which communicates with the vacuum chamber for evacuating the chamber, and extends inwardly of the inner tube for producing turbulence in the flow of fluid to aid in the transfer of heat energy from the inner tube to the fluid.

10 Claims, 3 Drawing Figures

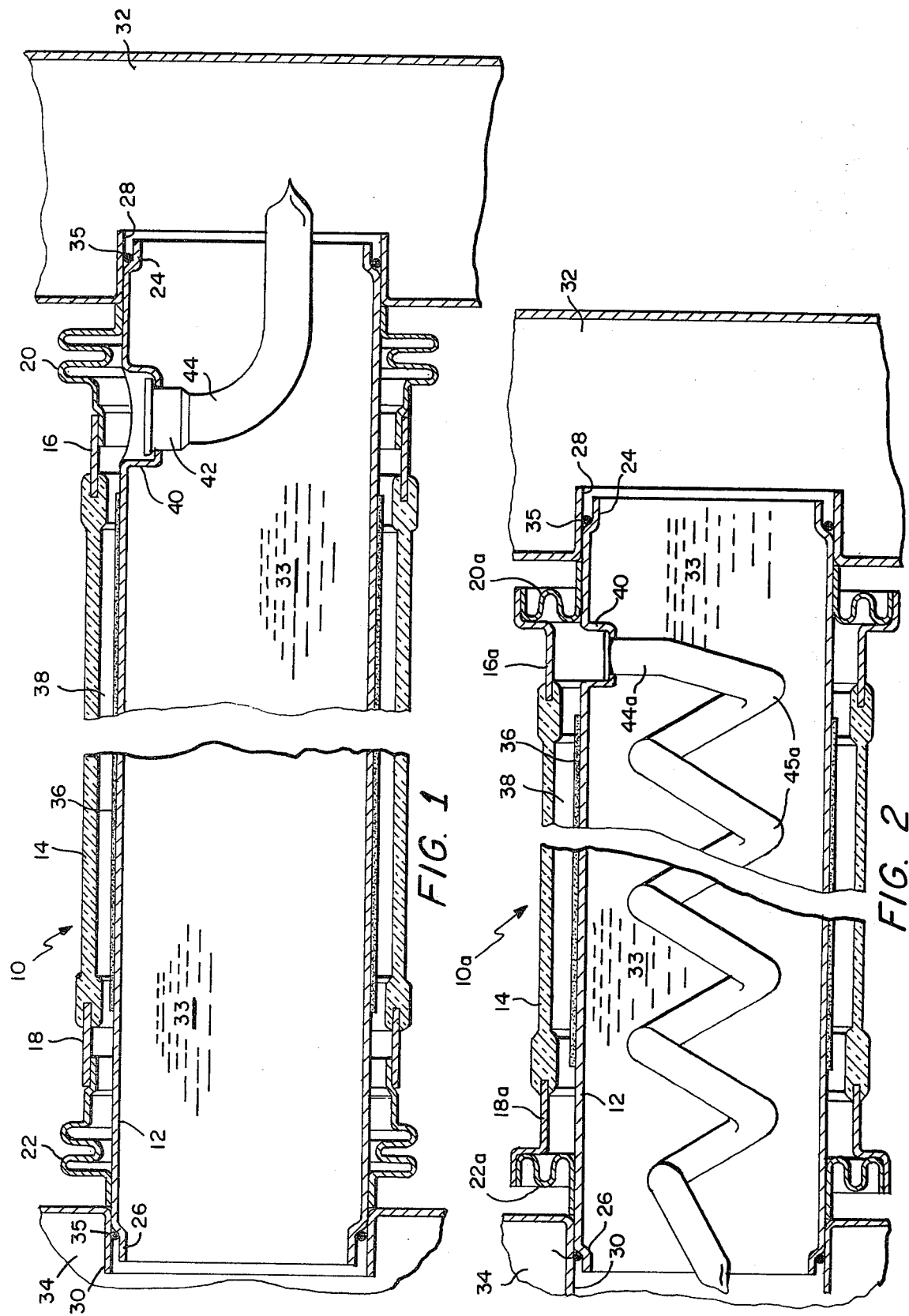

TURBULENT SOLAR COLLECTOR

BACKGROUND OF THE INVENTION

1. Field of the Invention

This invention relates generally to solar collectors and is concerned more particularly with a solar collector having more efficient means for conducting heat inwardly and transferring it to a fluid medium.

2. Discussion of the Prior Art

A solar collector of the tubular type generally includes a coaxial pair of inner and outer tubes having radially spaced wall portions. The outer tube usually is made of a material, such as glass, for example, which is transparent to solar energy. Generally, the inner tube has a blackened outer surface for absorbing impinging solar energy and converting it into thermal energy. Thus, a fluid, such as water, for example, may flow along the inner surface of the inner tube to extract energy therefrom and carry it to a thermal load.

The inner and outer tubes of the solar collector generally have respective opposing end portions sealed to one another; and the outer tube generally is provided with an exhaust tubulation for evacuating the annular space between the radially spaced wall portions of the tubes. The resulting vacuum space between the outer and inner tubes permits the passage of radiant solar energy, and minimizes heat losses due to convection and conduction from the outer surface of the inner tube. Consequently, the inner tube generally is made of glass also to provide ease in sealing opposing end portions thereof to respective opposing end portions of the outer tube, and to provide the inner an outer tubes with similar coefficients of thermal expansion.

The inner tube generally is designed to support the entire length of the outer tube, which may be considerable for a solar collector, and provide the rigidity required for maintaining the radial spaced relationship as well as protecting the integrity of the sealed end portions. Consequently, the inner tube generally has a thick wall to provide it with the necessary structural strength. However, the relatively thick wall of the inner tube reduces efficiency in conducting the heat energy from the coated outer surface to the inner surface.

Furthermore, a uniform flow of fluid through the inner tube generally is preferred in prior art solar collectors. However, the resulting laminar flow of fluid through the inner tube does not bring large portions of the fluid into contact with the inner surface of the inner tube for more efficiently transferring heat energy from the inner tube to the fluid.

SUMMARY OF THE INVENTION

Accordingly, these and other disadvantages are overcome by this invention which provides a solar collector of the tubular type having an outer tube made of a material, such as glass, for example, which efficiently transmits solar energy. This solar collector has an inner tube made of metallic material, such as copper, for example, which efficiently conducts heat energy inwardly from its outer surface and has the necessary structural strength for permitting the inner tube to have a thin wall so that the heat energy rapidly reaches the inner surface of the inner tube. The outer surface of the inner tube preferably is blackened, as by coating it with black chrome, for example, for efficiently absorbing incident solar energy and converting it into heat energy. Also, the inner tube is disposed for having a flow of fluid directed longitudinally through it in a turbulent manner to transfer heat efficiently from its inner surface to the fluid for conduction to a thermal load.

The inner and outer tubes of this solar collector have wall mid-portions radially spaced apart and respective opposing end portions flexibly sealed to one another through expansible joining members to form an interposed chamber or cavity which may be evacuated. The inner tube is provided with an exhaust tubulation which communicates with the chamber or cavity and extends inwardly of the inner tube and longitudinally out of and end portion thereof. Thus, the chamber or cavity may be evacuated through the exhaust tubulation to provide a vacuum space between the inner and outer tubes for permitting the passage of radiant solar energy and minimizing loss of heat energy from the inner tube, such as due to conduction and convection, for examples. After evacuation of the chamber or cavity, the exhaust tubulation is tipped-off to provide means within the inner tube for creating a turbulent flow of fluid therethrough and transferring heat energy efficiently from the inner tube to the fluid.

BRIEF DESCRIPTION OF THE DRAWING

For a better understanding of this invention, reference is made in the following more detailed description to the accompanying drawings wherein:

FIG. 1 is a longitudinal view, partly in section, of a solar collector embodying this invention;

FIG. 2 is a longitudinal view, partly in section, of an alternative solar collector embodying this invention.

DESCRIPTION OF THE PREFERRED EMBODIMENT

Figure 3:
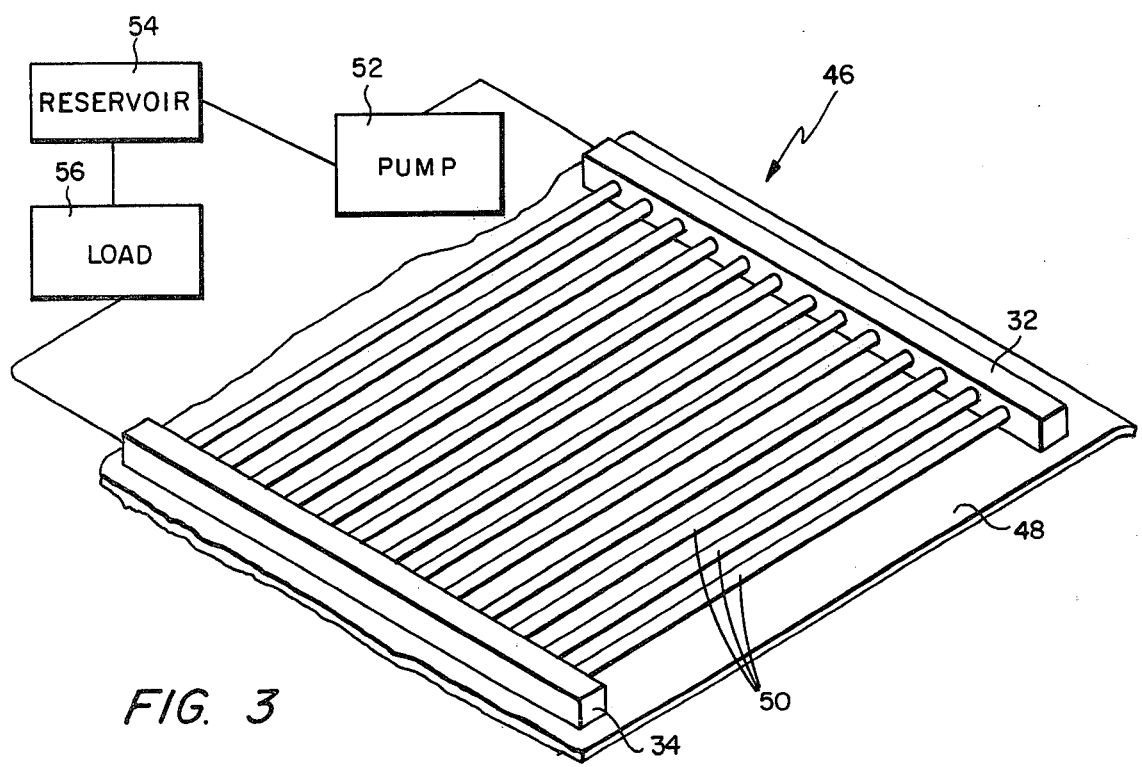
FIG. 3 is a schematic view of a solar panel fitted with the solar collector shown in FIG. 1.

Referring to the drawing wherein like characters of reference designate like parts, there is shown in FIG. 1 a solar collector 10 of the tubular type having an inner tube 12 encircled by a radially spaced outer tube 14. Outer tube 14 is made of an efficient radiation transmissive material, such as glass, for example, and has opposing end portions seale to adjacent end portions of respective sleeves 16 and 18. The sleeves 16 and 18 are made of suitably rigid glass-to-metal sealing material, such as Kovar, for example, and have opposing end portions sealed, as by welding, for example, to adjacent end portions of respective expansible members 20 and 22. Each of the members 20 and 22 may comprise a cylindrical bellows having a corrugated wall portion and made of suitable resilient material, such as beryllium copper, for example. The expansible members 20 and 22 have respective opposing end portions of reduced diameter sealed to encircled surface portions of the inner tube 12.

The inner tube 12 is made of efficient heat conductive material, such as copper, for example, and has respective opposing end portions 24 and 26 protruding from the expansible members, 20 and 22. Thus, the protruding end portions 24 and 26 of inner tube 12 may be inserted in respective sockets 28 and 30 of inlet and outlet headers, 32 and 34, respectively, in a fluid-tight manner, as by use of O-rings 35, for example. The inlet header 32 is disposed for directing a flow of fluid 33, such as water, for example, longitudinally through the inner tube 12 and into the outlet header 34. Radially aligned with the outer tube 14 is an outer surface portion of inner tube 12 which is blackened as by providing it with a coating 36 of black chrome, for example. The coated wall surface of inner tubes 12 and the spaced surrounding wall of outer tube 14 form an interposed annular cavity or chamber 38 having opposed end portions sealed by the respective sleeves 16 and 18 joined to the respective expansible members 20 and 22. A wall portion of inner tube 12 interfacing with the cavity or chamber 38 is provided with a cup-shaped recess 40. Recess 40 extends inwardly of tube 12 and terminates in an apertured end wall through which extends an exhaust bushing 42. The bushing 42 is made of suitable material, such as copper, for example, and has a flanged end portion sealably attached, as by brazing, for example, to the apertured end wall of recess 40.

Bushing 42 extends inwardly of tube 12 and has sealed into its opposing end portion one end of an exhaust tubulation 44 which may be made of rigid material, such as glass, for example. The exhaust tubulation 44 is provided with a right-angle bend for extending inwardly of tube 12 and then longitudinally out the adjacent open end thereof. Exhaust tubulation 44 comprises means for evacuating the cavity or chamber 38 to provide an annular vacuum space between the coated outer surface of tube 12 and the surrounding wall of outer tube 14. After evacuation of chamber 38 is completed, the exhaust tubulation 44 is sealed or tipped-off in a conventional manner to provide means for turbulating the flow of fluid 33 directed longitudinally through the inner tube 12.

In operation, solar energy from the sun passes through the transparent wall of outer tube 14 and radiates across the interposed vacuum space of chamber 38 to impinge on the coated outer surface of inner tube 12. As a result, the impinging solar energy is efficiently absorbed and converted to heat energy, which is conducted rapidly and efficiently by the metallic material of inner tube 12 into its inner surface. The annular vacuum space in chamber 38 aids in restricting loss of heat energy from the coated outer surface of inner tube 12 by conduction and convection.

Thus, the metallic material of inner tube 12 provides sufficient structural strength for permitting tube 12 to have a thin wall which supports outer tube 14 rigidly throughout its length. As a result, the structural integrity of vacuum chamber 30 including the sealed joints and the radial spacing between inner tube 12 and outer tube 14 is maintained. Also, the thin wall of inner tube 12 restricts longitudinal flow of heat toward the sealed joints, and enhances transverse flow of heat from the outer surface to the inner surface of tube 12. As a result, heat energy is conducted inwardly to the inner surface of tube 12 more rapidly and efficiently than obtained with the use of relatively thick glass inner tubes of the prior art.

Since the metallic inner tube 12 may have different thermal characteristics and tends to operate at higher temperatures than the glass outer tube 14, it may undergo greater thermal expansion in the longitudinal and radial directions with respect to the outer tube 14. For this reason, solar collectors of the prior art generally have the inner and outer tubes made of the same material in order to obtain similar thermal characteristics at the expense of more efficient heat conduction from the outer to the inner surfaces of the inner tube. However, this solar collector solves the problem of different thermal characteristics between the inner and outer tubes by providing the expansible members 20 and 22, respectively, in the joints sealing the metallic inner tube 12 to the outer glass tube 14. The expansible bellows 20 and 22 have sufficient surplusage of material in their corrugations to expand longitudinally and sufficient resiliency to flex radially to compensate for thermal expansion differences in the longitudinal and radial directions between the inner tube 12 and the outer tube 14.

A flow of fluid 33 is directed longitudinally through the inner tube 12 and is turbulated by the sealed-off length of exhaust tubulation 44. As a result, a greater portion of the fluid 33 is brought into contact with the inner surface of tube 12 than would be obtained with the uniform flow of fluid advocated by the prior art. Consequently, heat energy is transferred more efficiently from the inner surface of tube 12 to the fluid 33 for conduction to a thermal load, as compared to solar collectors of the prior art.

FIG. 2 shows an alternative solar collector 10a having a structure similar to the structure shown in FIG. 1 except the outer tube 14 has opposing end portions sealed to adjacent end portions of respective sleeves 16a an 18a. The sleeves 16a and 18a are provided with respective opposing end portions of enlarged diameter for sealing to outer peripheral portions of expansible diaphragms 20a and 22a, respectively. Accordingly, each of the respective diaphragms 20a and 22a may comprise a corrugated disc having an inner peripheral portion sealed to the outer surface of inner tube 12. Thus, the expansible diaphragms 20a and 22a, respectively, have sufficient surplusage of material in their corrugations to expand in the radial direction and sufficient resiliency to flex in the longitudinal direction, in order to compensate for differences in thermal expansion between inner tube 12 and outer tube 14.

Accordingly, the outer tube 14 of solar collector 10a is supported in radially spaced relationship with the coated outer surface of inner tube 12 to form therebetween a vacuum chamber 30 having opposed end portions sealed by the expansible members 20a and 22a joined to the respective sleeves 16a and 18a. Interfacing with the chamber 30 is a wall portion of inner tube 12 provided with a cup-shaped recess 40 which extends inwardly of tube 12 and has sealed in the bottom thereof a flanged end portion of an exhaust tubulation 44a. The exhaust tubulation 44a is made of flexible material, such as soft copper tubing, for example, and extends through an aperture bottom wall of recess 40. Exhaust tubulation 44a is provided with a plurality of turns or convolutions 45a having any desired configuration, and extends substantially the entire length of inner tube 12 to emerge from the far end thereof. Thus, the exhaust tubulation 44a is disposed to produce greater turbulence in the flow of fluid 33 substantially the entire length of solar collector 10a for ensuring greater efficiency in the transfer of heat energy from the inner surface of tube 12 to the fluid 33.

In FIG. 3, there is shown a solar collector panel 46 including a backing member 48 of solar energy reflective material which supports the inlet and outlet headers 32 and 34, respectively. Extending between the respective headers 32 and 34 is a plurality of solar collectors 50 which have opposed end portions fitted in a fluidtight manner into respective aligned sockets in the headers 32 and 34. Each of the solar collectors 50 may comprise a solar collector 10 shown in FIG. 1 or a solar collector 10a shown in FIG. 2. The inlet header 32 is connected, either hydraulically or pneumatically, to a pressurized source of fluid, such as a pump 52 connected to a fluid reservoir 54, for example, of the fluid. Outlet header 34 is similarly connected to a thermal load 56 which, in turn, may be connected to the reservoir 54. In operation, the solar panel 46 is exposed to the sun and fluid is pumped from the reservoir 54 to the inlet header 32 where it is distributed to respective collectors 50. The fluid passing through a respective collector 50 extracts heat efficiently, therefrom, as described, and passes through the outlet header 34 to carry the extracted heat energy to the thermal load 56. The heated fluid then may return to the reservoir 54 for recycling and re-heating.

Thus, it may be seen that the metallic inner tube 12 of the solar collector of this invention is more suited for providing the necessary structural strength and high heat conductivity required for the relatively long solar collectors 50 of panel 46. Also, it may seen that the exhaust tubulation, such as 44 or 44a, for examples, provided within the inner tube 12 of this solar collector is more suited for producing turbulence in the flow of fluid through the solar collector to transfer heat energy from the inner tube 12 to a greater portion of the fluid flowing through the collector. As a result, heat energy is transferred more efficiently from the solar collectors 50 of panel 46 to the fluid for conduction to the thermal load 56 than would be obtained from prior art solar collectors having an inner tube made of glass material and an outer tube provided with the exhaust tubulation for evacuating the interposed chamber.

From the foregoing, it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted as illustrative and not in any limiting sense.

What is claimed is:

1. A solar collector comprising:
   a first member having a solar energy transmissive wall portion;
   fluid conduit means including a second member having a solar energy absorbent wall portion, the second member being sealed to said first member to form an evacuable chamber between said first member and said second member, the fluid conduit means directing a flow of heat conductive fluid along said wall portion of the second member; and
   means extended in a fluid-tight manner through the second member into the fluid conduit means and disposed in communication with the chamber for evacuating the chamber.

2. A solar energy collector comprising:
   a first tube means for directing a flow of fluid through it and including a solar energy converter portion between longitudinally spaced annular portions;
   a second tube means in encircling relationship with the first tube means and including a solar energy transmissive portion disposed between longitudinally spaced annular portions, the solar energy transmissive portion being disposed in radially spaced alignment with the solar energy converter portion of the first tube means and the annular portions being sealed to respective annular portions of the first tube means for forming a vacuum chamber between said transmissive and converter portions of the tube means; and
   means communicating with said chamber sealed to the first tube means and extended inwardly thereof for evacuating the chamber and producing turbulence in the flow of fluid directed through the first tube means.

3. A solar energy collector as set forth in claim 2 wherein said communicating means includes an exhaust tubulation having one end portion sealed to the first tube means and a sealed-off end portion extended longitudinally within the first tube means.

4. A solar energy collector as set forth in claim 3 wherein said exhaust tubulation is made of flexible material and is provided with a convoluted configuration for maximizing turbulence of the fluid.

5. A solar collector comprising:
   a first member having a solar energy transmissive wall portion;
   a second member having a solar energy absorbent wall portion, the second member being sealed to said first member to form a chamber between said first member and said second member;
   fluid conduit means disposed for directing a heat conductive fluid along a surface portion of the second member; and
   meas communicating with the chamber sealed to said surface portion of the second member and disposed in the fluid conduit means for evacuating the chamber and producing turbulence in the fluid directed along said surface portion of the second member.

6. A solar collector comprising:
   a first tube means for directing a flow of fluid through it, the first tube means having longitudinally spaced annular portions and an interposed solar energy converter portion;
   a second tube disposed in spaced encircling relationship with the first tube means, the second tube having a solar energy transmissive portion disposed between a longitudinally spaced annular portions and radially aligned with said solar energy absorbent portion of the first tube means;
   joint means sealed between said longitudinally spaced annular portions of the first tube means and second tube for forming a vacuum chamber between said converter and said transmissive portions of the respective first tube means and second tube; and
   means communicating with said vacuum chamber sealed to said first tube means and extended inwardly thereof for evacuating said chamber and producing turbulence in said flow of fluid directed through the first tube means.

7. A solar collector as set forth in claim 6 wherein the joint means includes at least one member made of flexible material and sealed between respective annular portions of the first tube means and second tube for flexing to compensate for thermal differences between the first tube means and second tube.

8. A solar collector as set forth in claim 6 wherein the joints means includes expansible joint means for providing a surplusage of material between respective annular portions of the first tube means and second tube to compensate for thermal differences between the first tube means and second tube.

9. A solar collector as set forth in claim 8 wherein the expansible joint means comprises at least one corrugated member sealed between respective annular portions of the first tube means and second tube.

10. A solar collector as set forth in claim 9 wherein the first tube means comprises a metallic material and the second tube is made of glass material.

* * * * *

UNITED STATES PATENT OFFICE
CERTIFICATE OF CORRECTION

Patent No. 4,326,503                   Dated April 27, 1982

Inventor(s) Leonard W. Geier and Kenneth F. Dunn

It is certified that error appears in the above-identified patent and that said Letters Patent are hereby corrected as shown below:

Column 2, line 45, change "seale" to --sealed--.

Column 5, Claim 2, line 57, before "between" insert

--disposed--.

Signed and Sealed this

Twenty-seventh Day of September 1983

[SEAL]

Attest:

GERALD J. MOSSINGHOFF

Attesting Officer          Commissioner of Patents and Trademarks